(12) United States Patent
Rosen et al.

(10) Patent No.: US 10,645,033 B2
(45) Date of Patent: May 5, 2020

(54) BUFFER OPTIMIZATION IN MODULAR SWITCHES

(71) Applicant: Mellanox Technologies TLV Ltd., Raanana (IL)

(72) Inventors: Amir Rosen, Haifa (IL); Gil Levy, Hod Hasharon (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 29 days.

(21) Appl. No.: 15/469,652

(22) Filed: Mar. 27, 2017

(65) Prior Publication Data

US 2018/0278550 A1   Sep. 27, 2018

(51) Int. Cl.
| | |
|---|---|
| *H04L 12/879* | (2013.01) |
| *H04L 12/801* | (2013.01) |
| *H04L 12/937* | (2013.01) |
| *H04L 12/26* | (2006.01) |
| *H04L 12/935* | (2013.01) |

(52) U.S. Cl.
CPC ............ *H04L 49/901* (2013.01); *H04L 47/34* (2013.01); *H04L 49/254* (2013.01); *H04L 43/0864* (2013.01); *H04L 49/3036* (2013.01)

(58) Field of Classification Search
CPC ............... H04L 49/901; H04L 43/0864; H04L 45/7453; H04L 47/34; H04L 47/39; H04L 47/527; H04L 49/3063
See application file for complete search history.

(56) References Cited

U.S. PATENT DOCUMENTS

| | | | |
|---|---|---|---|
| 6,108,713 A | 8/2000 | Sambamurthy et al. |
| 6,154,446 A | 11/2000 | Kadambi et al. |
| 6,178,448 B1 | 1/2001 | Gray et al. |
| 6,594,263 B1 | 7/2003 | Martinsson et al. |
| 6,678,277 B1 | 1/2004 | Wils et al. |

(Continued)

FOREIGN PATENT DOCUMENTS

| | | |
|---|---|---|
| EP | 1720295 A1 | 11/2006 |
| EP | 2466476 A1 | 6/2012 |

(Continued)

OTHER PUBLICATIONS

U.S. Appl. No. 14/967,403 office action dated Nov. 9, 2017.

(Continued)

*Primary Examiner* — Pao Sinkantarakorn
*Assistant Examiner* — Kabir U Jahangir
(74) *Attorney, Agent, or Firm* — Kligler & Associates Patent Attorneys Ltd

(57) ABSTRACT

In a packet network of ingress nodes and egress nodes connected by a fabric transmit queues are associated with a hash table that stores packet descriptors. When new packets are received in the ingress nodes, credits are obtained from the egress nodes that reflect capacities of the transmit queues to accommodate the new packets. The credits are consumed by transmitting at least a portion of the new packets from the ingress nodes to the egress nodes via the fabric and storing descriptors of the new packets in a hash table. In order to transmit the packets in order by sequence number, when a desired packet sequence number is found by a hash lookup, the new packet having that sequence number is forwarded through the egress nodes.

25 Claims, 5 Drawing Sheets

(56) References Cited

U.S. PATENT DOCUMENTS

| | | | |
|---|---|---|---|
| 6,859,435 B1 | 2/2005 | Lee et al. | |
| 7,321,553 B2 | 1/2008 | Prasad et al. | |
| 7,346,059 B1* | 3/2008 | Garner | H04L 12/4625 |
| | | | 370/235 |
| 7,738,454 B1* | 6/2010 | Panwar | H04L 45/745 |
| | | | 365/49.17 |
| 7,773,621 B2 | 8/2010 | Jensen | |
| 7,778,168 B1 | 8/2010 | Rodgers et al. | |
| 7,813,348 B1 | 10/2010 | Gupta et al. | |
| 7,821,939 B2 | 10/2010 | Decusatis et al. | |
| 7,872,973 B2 | 1/2011 | Sterne et al. | |
| 7,894,343 B2 | 2/2011 | Chao et al. | |
| 8,078,743 B2 | 12/2011 | Sharp et al. | |
| 8,345,548 B2 | 1/2013 | Gusat et al. | |
| 8,473,693 B1 | 6/2013 | Muppalaneni et al. | |
| 8,565,092 B2 | 10/2013 | Arumilli et al. | |
| 8,576,715 B2 | 11/2013 | Bloch et al. | |
| 8,630,294 B1* | 1/2014 | Keen | H04L 45/7453 |
| | | | 370/252 |
| 8,644,140 B2 | 2/2014 | Bloch et al. | |
| 8,767,561 B2 | 7/2014 | Gnanasekaran et al. | |
| 8,811,183 B1 | 8/2014 | Anand et al. | |
| 8,879,396 B2 | 11/2014 | Guay et al. | |
| 8,989,017 B2 | 3/2015 | Naouri | |
| 8,995,265 B2 | 3/2015 | Basso et al. | |
| 9,014,006 B2 | 4/2015 | Haramaty et al. | |
| 9,325,619 B2 | 4/2016 | Guay et al. | |
| 9,356,868 B2 | 5/2016 | Tabatabaee et al. | |
| 9,385,962 B2 | 7/2016 | Rimmer et al. | |
| 9,426,085 B1 | 8/2016 | Anand et al. | |
| 9,648,148 B2 | 5/2017 | Rimmer et al. | |
| 9,742,683 B1 | 8/2017 | Vanini | |
| 2002/0055993 A1* | 5/2002 | Shah | H04L 47/10 |
| | | | 709/223 |
| 2002/0191559 A1 | 12/2002 | Chen et al. | |
| 2003/0108010 A1 | 6/2003 | Kim et al. | |
| 2003/0223368 A1 | 12/2003 | Allen et al. | |
| 2004/0008714 A1 | 1/2004 | Jones | |
| 2005/0053077 A1 | 3/2005 | Blanc et al. | |
| 2005/0169172 A1 | 8/2005 | Wang et al. | |
| 2005/0204103 A1 | 9/2005 | Dennison | |
| 2005/0216822 A1 | 9/2005 | Kyusojin et al. | |
| 2005/0226156 A1 | 10/2005 | Keating et al. | |
| 2005/0228900 A1 | 10/2005 | Stuart et al. | |
| 2006/0008803 A1 | 1/2006 | Brunner et al. | |
| 2006/0087989 A1 | 4/2006 | Gai et al. | |
| 2006/0092837 A1 | 5/2006 | Kwan et al. | |
| 2006/0092845 A1 | 5/2006 | Kwan et al. | |
| 2007/0097257 A1 | 5/2007 | El-Maleh et al. | |
| 2007/0104102 A1 | 5/2007 | Opsasnick | |
| 2007/0104211 A1 | 5/2007 | Opsasnick | |
| 2007/0201499 A1 | 8/2007 | Kapoor et al. | |
| 2007/0291644 A1 | 12/2007 | Roberts et al. | |
| 2008/0037420 A1 | 2/2008 | Tang et al. | |
| 2008/0175146 A1 | 7/2008 | Van Leekwuck et al. | |
| 2008/0192764 A1 | 8/2008 | Arefi et al. | |
| 2009/0207848 A1 | 8/2009 | Kwan et al. | |
| 2010/0220742 A1 | 9/2010 | Brewer et al. | |
| 2013/0014118 A1 | 1/2013 | Jones | |
| 2013/0039178 A1 | 2/2013 | Chen et al. | |
| 2013/0250757 A1 | 9/2013 | Tabatabaee et al. | |
| 2013/0250762 A1 | 9/2013 | Assarpour | |
| 2013/0275631 A1 | 10/2013 | Magro et al. | |
| 2013/0286834 A1 | 10/2013 | Lee | |
| 2013/0305250 A1 | 11/2013 | Durant | |
| 2014/0133314 A1 | 5/2014 | Mathews et al. | |
| 2014/0269274 A1* | 9/2014 | Banavalikar | H04L 47/39 |
| | | | 370/230 |
| 2014/0269324 A1 | 9/2014 | Tietz et al. | |
| 2014/0286349 A1 | 9/2014 | Kitada | |
| 2015/0026361 A1 | 1/2015 | Matthews et al. | |
| 2015/0124611 A1 | 5/2015 | Attar et al. | |
| 2015/0127797 A1 | 5/2015 | Attar et al. | |
| 2015/0180782 A1 | 6/2015 | Rimmer et al. | |
| 2015/0200866 A1 | 7/2015 | Pope et al. | |
| 2015/0381505 A1 | 12/2015 | Sundararaman et al. | |
| 2016/0135076 A1 | 5/2016 | Grinshpun et al. | |
| 2016/0191392 A1 | 6/2016 | Liu | |
| 2016/0294696 A1 | 10/2016 | Gafni et al. | |
| 2016/0337257 A1 | 11/2016 | Yifrach et al. | |
| 2016/0344636 A1 | 11/2016 | Elias et al. | |
| 2017/0118108 A1 | 4/2017 | Avci et al. | |
| 2017/0142020 A1 | 5/2017 | Sundararaman et al. | |
| 2017/0180261 A1 | 6/2017 | Ma et al. | |
| 2017/0187641 A1 | 6/2017 | Lundqvist et al. | |
| 2017/0295112 A1 | 10/2017 | Cheng et al. | |
| 2017/0373989 A1 | 12/2017 | Gafni et al. | |
| 2018/0205653 A1* | 7/2018 | Wang | H04L 45/745 |
| 2018/0241677 A1 | 8/2018 | Srebro et al. | |

FOREIGN PATENT DOCUMENTS

| | | |
|---|---|---|
| WO | 2009107089 A2 | 9/2009 |
| WO | 2013136355 A1 | 9/2013 |
| WO | 2013180691 A1 | 12/2013 |

OTHER PUBLICATIONS

U.S. Appl. No. 15/081,969 office action dated Oct. 5, 2017.
U.S. Appl. No. 15/063,527 office action dated Feb. 8, 2018.
U.S. Appl. No. 15/161,316 office action dated Feb. 7, 2018.
U.S. Appl. No. 14/994,164 office action dated Jul. 5, 2017.
U.S. Appl. No. 15/075,158 office action dated Aug. 24, 2017.
U.S. Appl. No. 15/081,969 office action dated May 17, 2018.
U.S. Appl. No. 15/432,962 office action dated Apr. 26, 2018.
U.S. Appl. No. 15/161,316 Office Action dated Jul. 20, 2018.
European Application # 17172494.1 search report dated Oct. 13, 2017.
European Application # 17178355 search report dated Nov. 13, 2017.
Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.
Pfister et al., "Hot Spot Contention and Combining in Multistage Interconnect Networks", IEEE Trans on Computers, vol. C-34, pp. 943-948, Oct. 1985.
Zhu et al.,"Congestion control for large-scale RDMA deployments", SIGCOMM, ACM, pp. 523-536, Aug. 17-21, 2015.
Hahne et al., "Dynamic Queue Length Thresholds for Multiple Loss Priorities", IEEE/ACM Transactions on Networking, vol. 10, No. 3, pp. 368-380, Jun. 2002.
Choudhury et al., "Dynamic Queue Length Thresholds for Shared-Memory Packet Switches", IEEE/ACM Transactions Networking, vol. 6, Issue 2 , pp. 130-140, Apr. 1998.
CISCO Systems, Inc.,"Advantage Series White Paper Smart Buffering", 10 pages, 2016.
Ramakrishnan et al., "The Addition of Explicit Congestion Notification (ECN) to IP", Request for Comments 3168, Network Working Group, 63 pages, Sep. 2001.
IEEE Standard 802.1Q™—2005, "IEEE Standard for Local and metropolitan area networks Virtual Bridged Local Area Networks", 303 pages, May 19, 2006.
Infiniband TM Architecture, Specification vol. 1, Release 1.2.1, Chapter 12, pp. 657-716, Nov. 2007.
IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.

(56) References Cited

OTHER PUBLICATIONS

Hoeiland-Joergensen et al., "The FlowQueue-CoDel Packet Scheduler and Active Queue Management Algorithm", Internet Engineering Task Force (IETF) as draft-ietf-aqm-fq-codel-06 , 23 pages, Mar. 18, 2016.
Gafni et al., U.S. Appl. No. 15/075,158, filed Mar. 20, 2016.
Shpiner et al., U.S. Appl. No. 14/967,403, filed Dec. 14, 2015.
Elias et al., U.S. Appl. No. 14/994,164, filed Jan. 13, 2016.
Aibester et al., U.S. Appl. No. 15/063,527, filed Mar. 8, 2016.
Kriss et al., U.S. Appl. No. 15/161,316, filed May 23, 2016.
Roitshtein et al., U.S. Appl. No. 14/961,923, filed Dec. 8, 2015.
CISCO Systems, Inc., "Priority Flow Control: Build Reliable Layer 2 Infrastructure", 8 pages, 2015.
Elias et al., U.S. Appl. No. 15/081,969, filed Mar. 28, 2016.
Gafni et al., U.S. Appl. No. 15/194,585, filed Jun. 28, 2016.
Zdornov et al., U.S. Appl. No. 15/432,962, filed Feb. 15, 2017.
Levy et al., U.S. Appl. No. 15/086,095, filed Mar. 31, 2016.
U.S. Appl. No. 15/432,962 office action dated Nov. 2, 2018.
U.S. Appl. No. 15/161,316 Office Action dated Dec. 11, 2018.
U.S. Appl. No. 15/963,118 Office Action dated Aug. 21, 2019.

* cited by examiner

BUFFER OPTIMIZATION IN MODULAR SWITCHES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information over data networks. More particularly, this invention relates to operations in the routing of packets in data switching networks.

2. Description of the Related Art

The meanings of certain acronyms and abbreviations used herein are given in Table 1.

TABLE 1

| Acronyms and Abbreviations | |
|---|---|
| ASIC | Application-Specific Integrated Circuit |
| DSID | Destination Switching Identifier |
| HOL | Head Of the Line |
| RQ | Receive Queue |
| RTT | Round Trip Time |
| SSID | Source Switching Identifier |
| TQ | Transmit Queue |
| VOQ | Virtual Output Queue |

Implementation of common architectures for networks switches and routers involves modular switches. A modular data switch serves a large number of network ports and is managed as a single entity. The architecture is built of two components: 1) line card switch; and 2) fabric switch. Line card switch ports are connected to network ports and fabric switches establish connectivity between the line card switches. One connection topology in which modular switches are used is the multistage clos network. Such data switches constitute the core of common Ethernet switches, IP routers, multi-service platforms, various transmission network elements and legacy communication equipment. Buffering within the switches normally serves to resolve problems like congestion and contention among switch ports.

For example, commonly assigned U.S. Patent Application Publication No. 2011/0058571 to Gil Bloch et al., entitled *Data Switch with Shared Port Buffers*, which is herein incorporated by reference, describes a system of switch ports, each switch port including one or more port buffers for buffering data that traverses the switch port. A switch fabric is coupled to transfer the data between the switch ports. A switch control unit is configured to reassign at least one port buffer of a given switch port to buffer a part of the data that does not enter or exit the apparatus via the given switch port, and to cause the switch fabric to forward the part of the data to a destination switch port via the at least one reassigned port buffer.

SUMMARY OF THE INVENTION

One of the main challenges in designing modular switches is providing high throughput. The throughput is dictated by collisions of traffic moving upstream and downstream. Sending traffic through the fabric on the upstream direction comprises selecting a fabric device for traffic received from a network port and targeting a network port on another line card.

Hash-based forwarding ensures flow ordering. The drawback is that hashing does not spread the traffic ideally among the fabric switches, with the result that congestion occur at the line card, known as head-of-line (HOL) congestion. Moreover, when the number of flows is low hash performance is particularly weak.

Possible dynamic forwarding schemes include random selection of switches, and adaptive switch selection based on link load. Dynamic forwarding schemes result in packets from a flow arriving out of order, due, for example, to variable latencies in the fabric switches. This problem is handled by maintaining a reorder buffer at every egress line card.

The reorder buffer size can be statically allocated. The static buffer size is calculated as the product of the number of ordering domains and a tolerance for packet disorder. A series of ordering domains can be defined, for example as tuples of a transmitting device and a receiving device in which all members of the series share a common identifier, such as an SSiD or DSiD. The tolerance can be expressed in terms of the switch latencies involved in a round trip, or as a maximum variation in packet arrival order, such as 20 packets. Static buffers of this sort require a large memory allocation.

In an alternative approach dynamic reorder buffer sizes can be used, in which each ordering domain is maintained as a linked list. While this requires much less memory than static buffer allocation, it incurs the complexity of link list management, which makes this approach less attractive.

Embodiments of the invention provide an optimized packet buffer architecture to provide high throughput through while maintaining a small buffer capacity in ASiCs of the network elements. A small reorder buffer can be economically supported by an embedded memory, which reduces the cost of the system for a given number of ports and bandwidth. Buffer memory requirements are kept small by implementing the reordering domain as hash tables rather than linked lists. Hash collisions can be practically avoided by a suitable choice of hashing function. Compared with known hash-based forwarding schemes, head-of-line congestion is lessened because at any point in time the hash table is mainly populated by packet descriptors having closely related incremental sequence numbers, which facilitates design of a suitable hash function in which collisions are rare.

A similar result may be obtained using external packet buffers. However this approach is less attractive because external memory accesses are slower than internal memory, which limits the bandwidth of switches connected to line cards. Hence, more resources are required to providing the same bandwidth than when internal reorder buffers are used.

There is provided according to embodiments of the invention a method of communication, which is carried out in a networked system of ingress nodes and egress nodes connected by a fabric by maintaining transmit queues of pending packets awaiting transmission through respective ports of the egress nodes. The transmit queues are associated with a hash table that stores packet descriptors including packet sequence numbers. The method is further carried out by receiving new packets in the ingress nodes, receiving credits from the egress nodes that reflect capacities of the transmit queues to accommodate the new packets, consuming the credits by transmitting at least a portion of the new packets from the ingress nodes to the egress nodes via the fabric, storing descriptors of the transmitted new packets in the hash table, determining by accessing the hash table that one of the descriptors in the hash table contains a desired packet sequence number, and thereafter forwarding the transmitted new packet described by the one descriptor from the egress nodes.

Yet another aspect of the method includes requesting transmission of the credits from the egress nodes to the ingress nodes.

Still another aspect of the method includes autonomously transmitting the credits from the egress nodes to the ingress nodes.

According to one aspect of the method, there is a single hash table that services all the transmit queues. Alternatively, there is a plurality of hash tables that service one or more of the transmit queues.

Yet another aspect of the method includes calculating a size of the hash table based on a round trip time between the ingress nodes and the egress nodes and a latency variation for passage through the fabric.

Still another aspect of the method includes calculating a size of the hash table according to a size of a packet memory in the egress nodes that is allocated for packet buffering.

Yet another aspect of the method includes storing the descriptors of the new packets in virtual output queues in order of packet sequence numbers of the new packets, and the credits are consumed by transmitting the new packets according to positions thereof in the virtual output queues.

According to a further aspect of the method transmitting the new packets includes selecting fabric ports of the ingress nodes according to a load-balancing algorithm and enqueuing the new packets in transmit queues of the selected fabric ports of the ingress nodes.

One aspect of the method includes storing the descriptors of the new packets in virtual output queues and limiting sizes of the transmit queues according to bandwidths of the egress nodes and a latency measured by a time required to conclude a handshake between the transmit queues and the virtual output queues.

According to an additional aspect of the method, a key of the hash table is a combination of the respective packet sequence numbers and an ordering domain of the transmitted new packets.

Another aspect of the method, requesting and receiving credits are performed by a bandwidth manager that is linked to the ingress nodes and the egress nodes.

There is further provided according to embodiments of the invention a system including a packet network having ingress nodes and egress nodes connected by a fabric, and a hash table stored in a memory of the egress nodes. The egress nodes are provided with ports and transmit queues of pending packets awaiting transmission through respective ports. The hash table stores packet descriptors of the pending packets including packet sequence numbers. The ingress nodes and the egress nodes are configured to intercommunicate via the fabric and are cooperative for receiving new packets in the ingress nodes, receiving credits from the egress nodes that reflect capacities of the transmit queues to accommodate the new packets, consuming the credits by transmitting at least a portion of the new packets from the ingress nodes to the egress nodes via the fabric, storing descriptors of the transmitted new packets in the hash table, determining by accessing the hash table that one of the descriptors in the hash table contains a desired packet sequence number, and thereafter forwarding the transmitted new packet described by the one descriptor from the egress nodes.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions

A "switch fabric" or "fabric" refers to a network topology in which network nodes interconnect via one or more network switches (such as crossbar switches), typically through many ports. The interconnections are configurable such that data is transmitted from one node to another node via designated ports. A common application for a switch fabric is a high performance backplane. Typically the fabric is implemented by chassis-based modular switches and line cards.

In a system of ingress nodes, egress nodes, and a fabric therebetween, an "ingress node" or "ingress device" is a device that accepts traffic originating from outside the system and directs the traffic to a destination within the fabric.

An "egress node" or "egress device" is a device in the system that receives traffic from the fabric and directs the traffic to a destination outside the system.

A "credit" transferred by an egress node to an ingress node confers a right upon the ingress node to consume a specified portion of the memory of the egress node.

System Overview.

Figure 1:
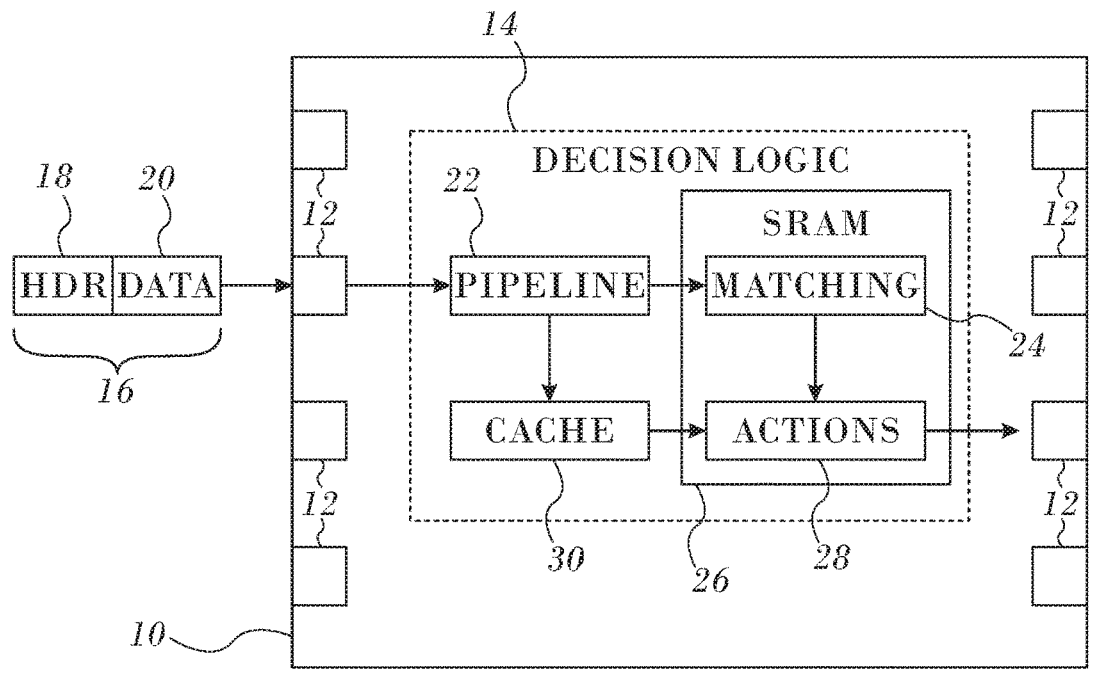
FIG. 1 is a block diagram that schematically illustrates a network element, which operates as a packet transmission apparatus in accordance with an embodiment of the invention.

Turning now to the drawings, reference is now made to FIG. 1, which is a block diagram that schematically illustrates a network element 10, which operates as packet transmission apparatus in accordance with an embodiment of the invention. Typically, network element 10 is configured as a network switch or router, for example, with multiple ports 12 connected to a packet communication network. Decision logic 14 within element 10 applies classification rules in forwarding data packets 16 between ports 12, as well as performing other actions, such as encapsulation and de-capsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 14.

In the pictured embodiment, decision logic 14 receives packet 16 containing a header 18 and payload data 20. A processing pipeline 22 in decision logic 14 extracts a classification key from each packet 16, typically (although not necessarily) including the contents of certain fields of header 18. For example, the key may comprise the source and destination addresses and ports and a protocol identifier. Pipeline 22 matches the key against a matching database 24 containing a set of rule entries, which is stored in an SRAM 26 in network element 10, as described in detail hereinbelow. SRAM 26 also contains a list of actions 28 to be performed when a key is found to match one of the rule entries. For this purpose, each rule entry typically contains a pointer to the particular action that logic 14 is to apply to packet 16 in case of a match.

In addition, network element 10 typically comprises a cache 30, which contains rules that have not been incorporated into the matching database 24 in SRAM 26. Cache 30 may contain, for example, rules that have recently been added to network element 10 and not yet incorporated into the data structure of matching database 24, and/or rules having rule patterns that occur with low frequency, so that their incorporation into the data structure of matching database 24 would be impractical. The entries in cache 30 likewise point to corresponding actions 28 in SRAM 26. Pipeline 22 may match the classification keys of all incoming packets 16 against both matching database 24 in SRAM 26 and cache 30. Alternatively, cache 30 may be addressed only if a given classification key does not match any of the rule entries in database 24 or if the matching rule entry indicates (based on the value of a designated flag, for example) that cache 30 should be checked, as well, for a possible match to a rule with higher priority.

Pipeline 22 typically comprises dedicated or programmable hardware logic, which is configured to carry out the functions described herein.

Figure 2:
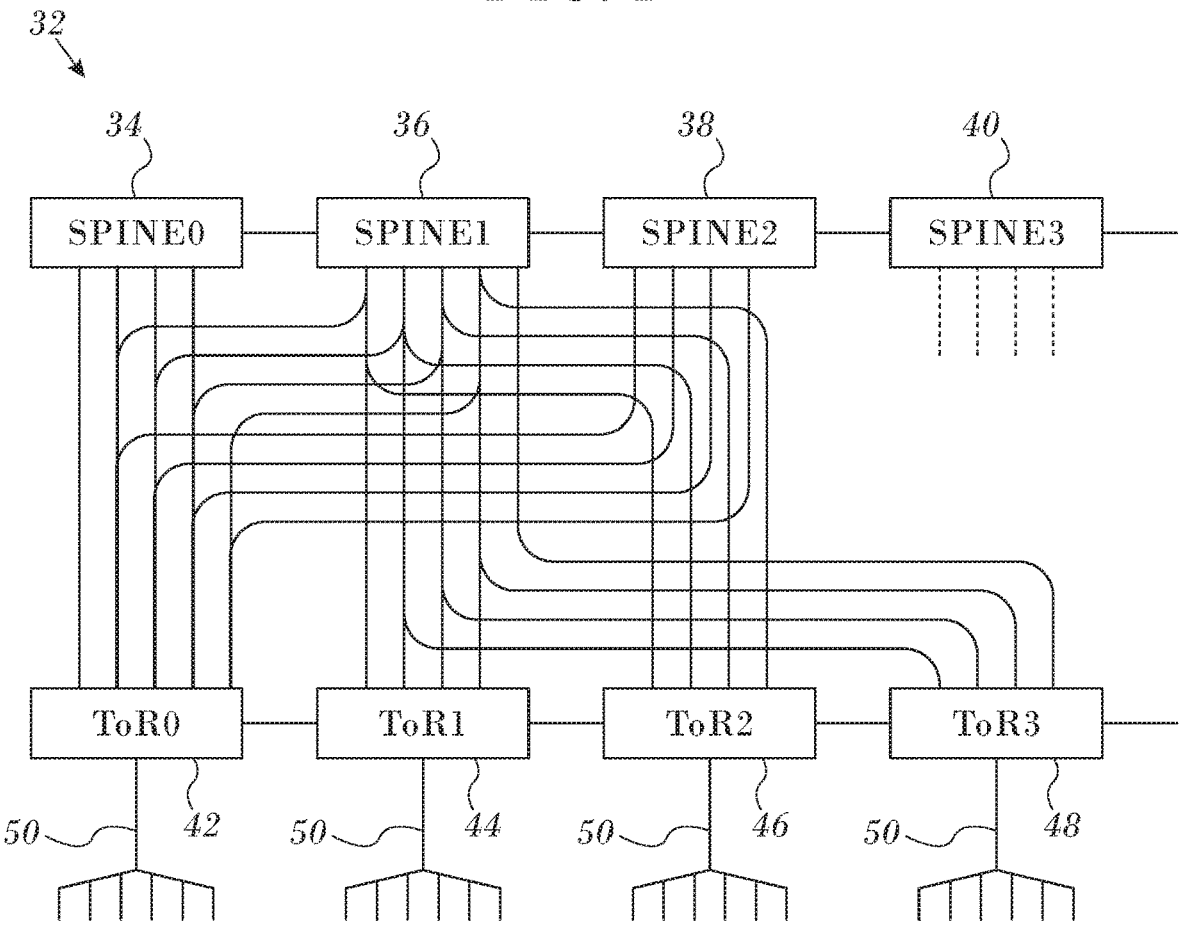
FIG. 2 is a block diagram of a portion of a fabric which is operated in accordance with an embodiment of the invention.

Reference is now made to FIG. 2, which is a detailed block diagram of a portion of a fabric 32, which is operated in accordance with an embodiment of the invention. Shown representatively are four spine nodes 34, 36, 38, 40 and four leaf nodes 42, 44, 46, 48 that interconnect with the spine nodes and which can be realized as the network element 10 (FIG. 1). Links 50 carry outflow data from the leaf nodes 42, 44, 46, 48. The leaf and spine switches are typically implemented as line cards and crossbar switches. Packet data communication within the fabric 32 is conducted by high-speed serial transmission.

Packet Forwarding by an Ingress Device.

Figure 3:
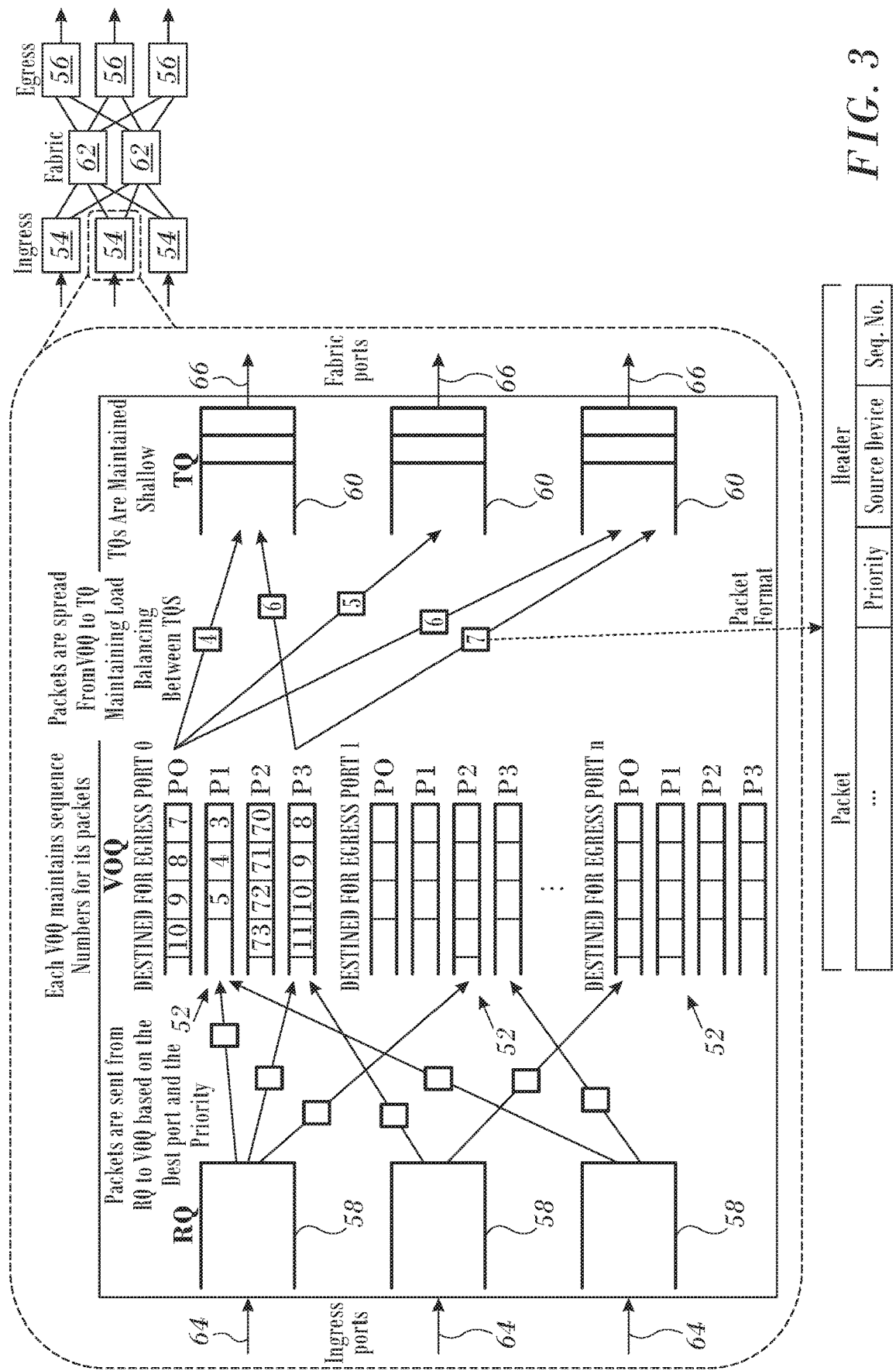
FIG. 3 is a diagram illustrating packet forwarding from an ingress device in accordance with an embodiment of the invention.

Reference is now made to FIG. 3, which is a diagram illustrating packet forwarding from an ingress device in accordance with an embodiment of the invention The ingress device is required to support virtual output queues (VOQ). Virtual output queues 52 are separate queues that are maintained by ingress devices 54, one queue for each of the possible egress devices 56. Their use minimizes head-of-line blocking.

In this section the requirements for packet forwarding from an ingress device are detailed: Each of the ingress devices 54 has any number of ingress ports and maintains three types of queues. Each of the ingress ports is associated with a receive queue 58 (RQ) that absorbs incoming traffic. The virtual output queues 52 hold descriptors of traffic committed for transmission to specific egress devices 56 according to a destination port and egress priority. Transmit queues 60 (TQs) accept descriptors of pending traffic from the virtual output queues 52 for transmission from the ingress devices 54 through fabric switch 62 to the respective egress devices 56. The transmit queues 60 are generally chosen by a load-balancing algorithm in the ingress devices 54.

The number of VOQs is the product:

(Number of target ports)×(Number of Traffic Priorities), where "ports" is the number of network ports supported by a fabric, e.g., a modular fabric.

The ingress device is required to support a three-stage handshake;

1.) Each ingress device requests a credit from a destination egress device.
2) Each egress device responds by returning a credit to the ingress device.
3. Each ingress device consumes its credit by transmitting a packet to the egress device according to its position in a VOQ.

In some embodiments the credit may be transmitted automatically, e.g., periodically, from the egress device to the ingress device without an explicit request.

In FIG. 3 after entry into ingress ports 64 the packets are received in receive queues 58. Virtual output queues 52 maintain descriptors of the packets including sequence numbers pending selection and insertion of the packets into transmit queues 60. Fabric ports 66 face the fabric switches. The fabric ports 66 and their associated transmit queues 60 are selected by an algorithm, for example a load-balancing algorithm in the ingress devices 54.

The transmit queues 60 are maintained very short, according to a bandwidth delay product: a product of the required bandwidth of the associated fabric port and a latency measured by the propagation delay involved in dequeuing the virtual output queues 52 and movement of packets into the transmit queues 60. The latency is largely due to propagation delay within the ASiC of the ingress device. Any congestion is managed using the VOQs. Transmit queues 60 are available as destinations only if the length of the transmit queues 60 do not exceed a shallow threshold, whose value is system-dependent, as noted above.

Virtual output queues 52 maintain packet descriptors in order of their packet sequence numbers. They provides packet descriptors only to available transmit queues 60 with the objective of load balancing among the transmit queues

60. As virtual output queues 52 are maintained for each of the possible egress devices 56, as shown in FIG. 3, it is possible for packets held in any of the virtual output queues 52 to be transmitted to different transmit queues 60, a process known as "packet based load balancing".

Each of the virtual output queues 52 maintains a running counter of packet sequence numbers. Each transmitted packet is provided with its associated sequence number upon transmission. The packet also has to include its source device and its priority (for domain ordering identification).

Packet Forwarding by an Egress Device.

Figure 4:
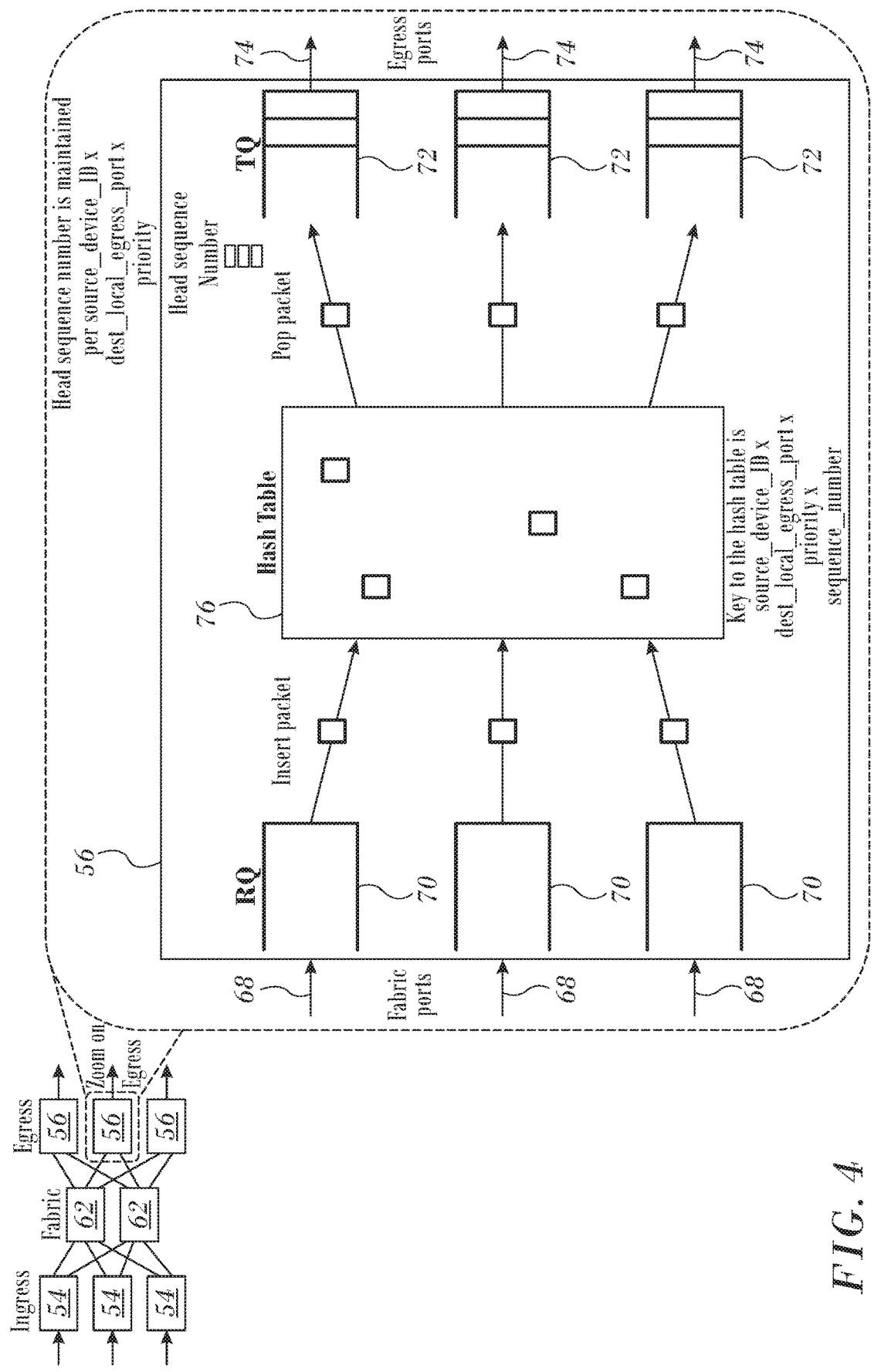
FIG. 4 is a diagram illustrating packet forwarding by an egress device in accordance with an embodiment of the invention.

Reference is now made to FIG. 4, which is a diagram illustrating packet forwarding by egress device 56 in accordance with an embodiment of the invention. Egress devices 56 each comprise ingress fabric ports 68, receive queues 70 and transmit queues 72 and egress ports 74, respectively.

The egress devices 56 are required to be aware of ordering domains. The number of ordering domains is:

Number_of_source_devices×Number_of_local_Egress_ports×Number_of_priorities.

Descriptors having packet sequence numbers relatively close to the sequence number of a current packet in the TQ are stored in a hash table 76. While hash table 76 is shown within egress device 56, this is not necessarily the case. In a practical system, out-of-order packet descriptors are close enough to one another in their sequence numbers to be contained within a relatively small hash table and memory buffer, e.g., packets within 20 sequence numbers of one another. The key to the hash table 76 can be, for example:

Sequence number×Ordering Domain, or

Source Device identifier×Local Destination Egress port×Priority×Sequence number.

Upon receiving appropriate credit, the ingress devices 54 send the packet descriptors from virtual output queues 52 (FIG. 3) to receive queues 70 via the fabric switches 62 to be stored in the hash table 76.

The egress devices 56 remove or pop the packet descriptors from the hash table 76 in order of their sequence numbers for insertion into transmit queues 72. This handles any necessary reordering for packets that have reached the egress devices 56 out of order. If a sequence number is missing, it is initially assumed that the packet has not yet arrived at the egress devices 56, and a delay results while arrival is awaited. However, after a predetermined period, if the sequence number is still missing, the associated packet is assumed to be lost, and removal from the hash table 76 continues with the next sequence number.

Hash Table of Descriptors.

Continuing to refer to FIG. 4, in this embodiment the egress devices 56 have a common hash table 76 for each of their transmit queues 72 and associated egress ports 74, which is shared by all priorities of the transmit queues 60. The hash table 76 stores packet descriptors sent from the ingress devices 54. The size of the hash table 76 correlates with the size of the memory allocated for packet buffering in the egress device 56. Space in the memory (or the hash table) is allocated using the above-noted three-stage hand shake mechanism: The amount of pending traffic in each of the virtual output queues 52 (FIG. 3) is reported to the egress devices 56.

Credits, i.e., indications of available memory space in an egress device, are sent to all or the ingress devices 54 based on the state of the transmit queues 72, which can be measured by packet memory availability. The credits may be measured in bytes of available memory.

Ingress devices 54 transmits traffic to the ingress ports 68 of the egress devices 56 based on credit availability for the particular egress device.

In one approach, the hash table size is calculated based on round trip time (RTT)+(out-of-order degree×number of traffic priorities). The term "out-of-order degree" refers to latency variation for passage through the fabric. It is one measure of disorder in the transmission of packets. In one embodiment the limiting sizes of the transmit queues is determined according to bandwidths of fabric ports of the ingress nodes and a latency measured by a time required to conclude a handshake between the transmit queues and the virtual output queues.

The descriptor credit mechanism described above guarantees that there is available storage for each packet descriptor when it is received in the ingress fabric ports 68. As noted above, a suitable hash table implementation assures that space availability approaches 100%. This can be achieved by cuckoo hashing implemented in hardware. One technique of cuckoo hashing is described in commonly assigned application Ser. No. 15/086,095, entitled Cuckoo Hashing with Single and Double Size Entries, which is herein incorporated by reference. Cuckoo hashing can achieve 99% space availability. If the hash table memory is for example 110% or even 120% compared to the number of credits then only a few iterations are needed by cuckoo hashing. Since the traffic incoming from a single VOQ has an incremental sequence number a suitable hash function achieves better than random utilization of the hash table.

In one embodiment the hash table 76 is shared, with some entries reserved for each of the transmit queues 72 and some shared by all transmit queues 72, depending on the organization of the memory of the egress devices 56 and the allocation algorithm. This can reduce the size of the memory with the tradeoff that rarely (the probability depends on the relationship between reserved and shared space) HOL blockage between queues can occur. The same approach can be used to share hash table memory among the transmit queues 72.

Packet Forwarding within the Fabric.

Forwarding is based on tags provided by the ingress devices 54. The ingress devices 54 and egress devices 56 are otherwise indifferent to the internal flow of data within the fabric switches 62.

First Alternate Embodiment.

Figure 5:
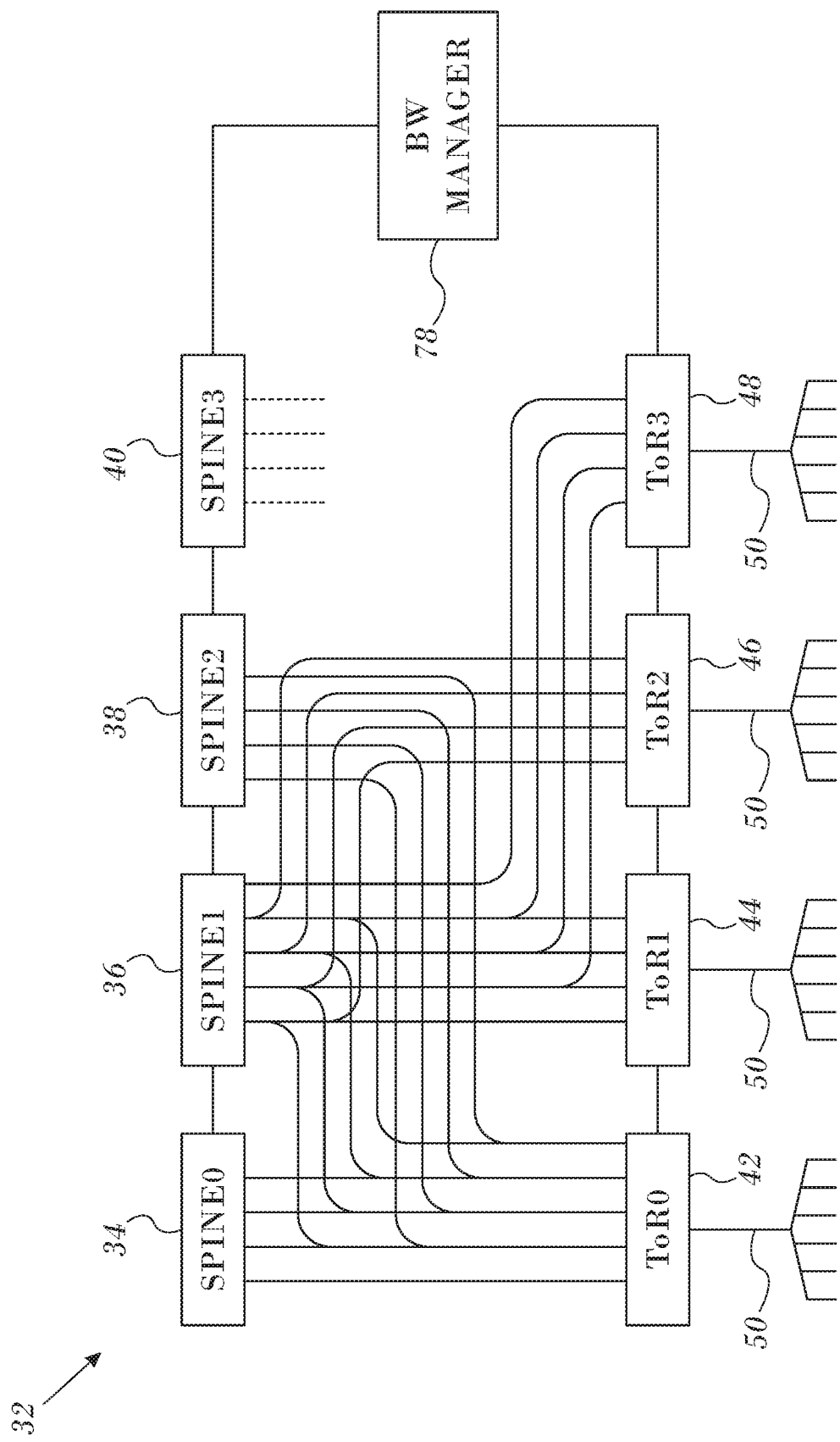
FIG. 5 is a block diagram of a portion of a fabric which is operated in accordance with an alternate embodiment of the invention.

Reference is now made to FIG. 5, which is a detailed block diagram of a portion of the fabric 32, which is operated in accordance with an alternate embodiment of the invention. In this embodiment a bandwidth manager 78 is linked to the spine nodes 34, 36, 38, 40 and leaf nodes 42, 44, 46, 48. The bandwidth manager 78 controls aspects of the operation of the fabric 32, such as routing of messages, performing any necessary arbitration, and remapping of inputs to outputs. Routing issues typically relate to the volume of the traffic and the bandwidth required to carry the traffic, which may include either the aggregate bandwidth or the specific bandwidth required between various pairs of computing nodes (or both aggregate and specific bandwidth requirements). Additionally or alternatively, other characteristics may be based, for example, on the current traffic level, traffic categories, quality of service requirements, and/or on scheduling of computing jobs to be carried out by computing nodes that are connected to the network. Specifically, for the purposes of embodiments of the present invention, the bandwidth manager 78 is concerned with selection of the switches and the control of links between the switches.

Moreover, the bandwidth manager 78 may store all the information necessary to accept all the requests from the ingress devices, allocate and distribute credits from the egress devices, thereby eliminating portions of the above-described three-way handshake.

The bandwidth manager 78 may be implemented as a dedicated processor, with memory and suitable interfaces, for carrying out the functions that are described herein in a centralized fashion. This processor may reside in one (or more) of the nodes of the fabric 32, or it may reside in a dedicated management unit. In some embodiments, communication between the bandwidth manager 78 and the switches 48, 50 may be carried out through an out-of-band channel and does not significantly impact the bandwidth of the fabric nor that of individual links.

Alternatively or additionally, although bandwidth manager 78 is shown in FIG. 5, for the sake of simplicity, as a single block, some or all of the functions of this manager may be carried out by distributed processing and control among the spine nodes 34, 36, 38, 40 and leaf nodes 42, 44, 46, 48. The term "bandwidth manager," as used herein, should therefore be understood to refer to a functional entity, which may reside in a single physical entity or be distributed among multiple physical entities.

Second Alternate Embodiment.

Figure 6:
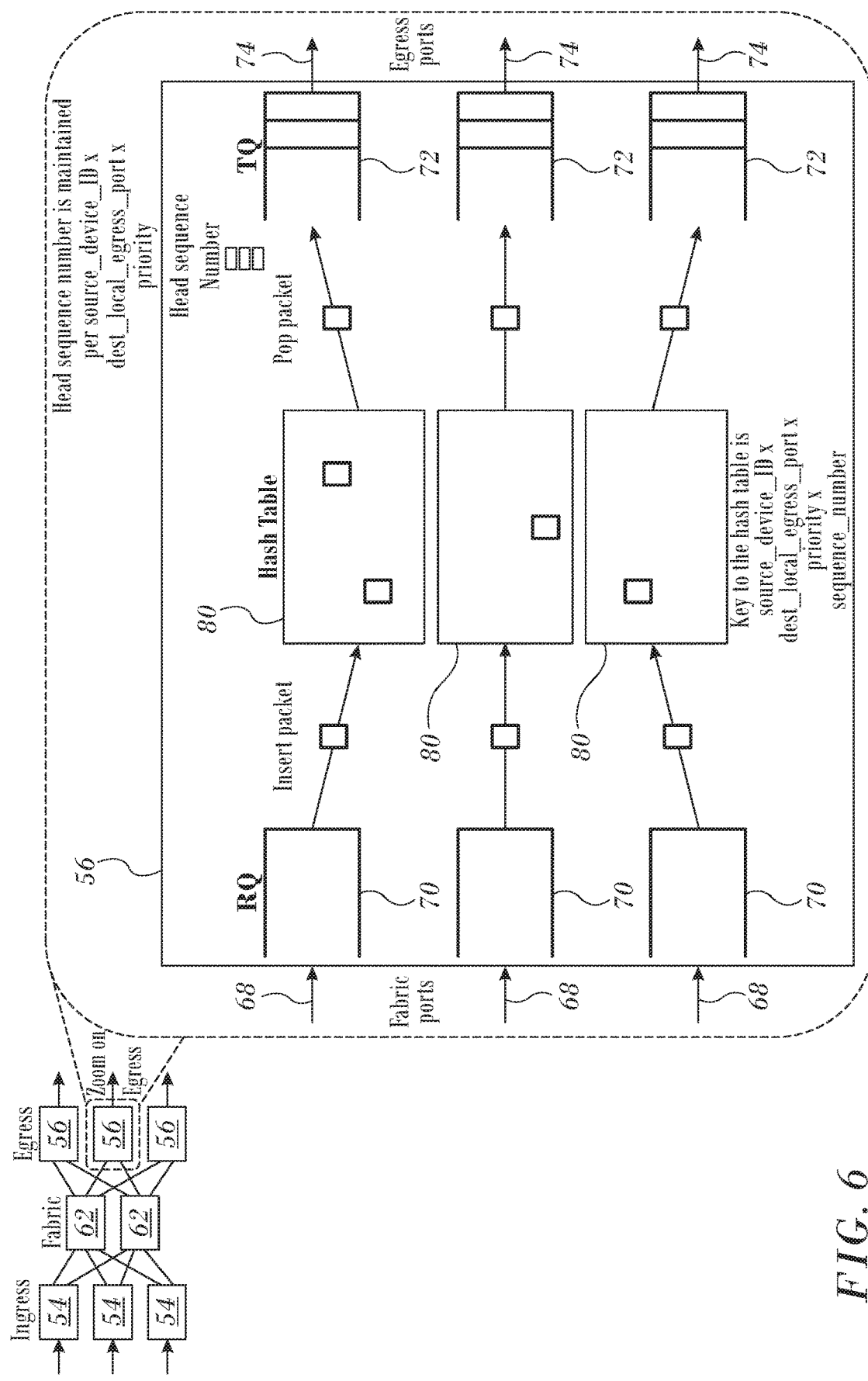
FIG. 6 is a diagram illustrating packet forwarding by an egress device in accordance with an alternate embodiment of the invention.

Reference is now made to FIG. 6, which is a diagram illustrating packet forwarding by egress device 56 in accordance with an alternate embodiment of the invention. This embodiment is similar to FIG. 4, except now the egress devices 56 may maintain multiple instances of a hash table 80 that service one or more of the transmit queues 72 and associated egress ports 74.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication comprising the steps of:
In a networked system of ingress nodes, and egress nodes connected by a fabric of switches maintaining in the egress nodes transmit queues of pending packets awaiting transmission through respective ports of the egress nodes;
maintaining a hash table in each of the egress nodes;
receiving new packets in the ingress nodes, the new packets having packet sequence numbers;
transmitting at least a portion of the new packets from the ingress nodes to the egress nodes via the fabric;
maintaining descriptors of the new packets, the descriptors including the packet sequence numbers, in virtual output queues in the ingress nodes in an order of the packet sequence numbers;
transmitting the descriptors from the virtual output queues to the egress nodes;
in respective egress nodes storing the transmitted descriptors of the new packets in the hash table;
performing a hash lookup to the hash table;
finding in an entry of the hash table one of the descriptors having a desired packet sequence number; and
thereafter forwarding the new packet described by the one descriptor from the egress nodes via the transmit queues.

2. The method according to claim 1, further comprising requesting transmission of credits from the egress nodes to the ingress nodes.

3. The method according to claim 2, wherein the steps of requesting transmission of credits are performed by a bandwidth manager that is linked to the ingress nodes and the egress nodes.

4. The method according to claim 2, further comprising autonomously transmitting the credits from the egress nodes to the ingress nodes.

5. The method according to claim 1, wherein the hash table consists of a single hash table that services all the transmit queues.

6. The method according to claim 1, wherein the hash table comprises a plurality of hash tables that service one or more of the transmit queues.

7. The method according to claim 1, further comprising calculating a size of the hash table based on a round trip time between the ingress nodes and the egress nodes and a latency variation for passage through the fabric.

8. The method according to claim 1, further comprising calculating a size of the hash table according to a size of a packet memory in the egress nodes that is allocated for packet buffering.

9. The method according to claim 2, further comprising consuming the credits by transmitting the new packets according to positions thereof in the virtual output queues.

10. The method according to claim 9, wherein the ingress nodes have fabric ports and transmitting the new packets comprises selecting the fabric ports of the ingress nodes according to a load-balancing algorithm and enqueuing the new packets in transmit queues of the selected fabric ports of the ingress nodes.

11. The method according to claim 1, further comprising limiting sizes of the transmit queues according to bandwidths of fabric ports of the ingress nodes and a latency measured by a time required to conclude a handshake between the transmit queues and the virtual output queues.

12. The method according to claim 1, wherein a key of the hash table is a combination of the respective packet sequence numbers and an ordering domain of the new packets.

13. A system comprising:
a packet network comprising ingress nodes and egress nodes
a fabric of switches connecting the ingress nodes and the egress nodes in the network, the egress nodes having a memory, a hash table stored in the memory, ports and transmit queues of pending packets awaiting transmission through respective ports of the egress nodes, the hash table storing packet descriptors of the pending packets, the descriptors comprising packet sequence numbers, wherein the ingress nodes and the egress nodes are configured to intercommunicate via the fabric and are cooperative for:
receiving new packets in the ingress nodes;
storing the descriptors of the new packets in virtual output queues in the ingress nodes in an order of the packet sequence numbers;
receiving credits from the egress nodes, the credits comprising capacities of the transmit queues to accommodate the new packets;
transmitting the descriptors of the new packets from the virtual output queues to the egress nodes;
consuming the credits by transmitting at least a portion of the new packets from the ingress nodes to the egress nodes via the fabric;

in the egress nodes storing the transmitted descriptors of the new packets in the hash table;

performing a hash lookup to the hash table;

finding in an entry of the hash table one of the descriptors in the hash table that contains a desired packet sequence number; and thereafter forwarding the new packet described by the one descriptor from the egress nodes via the transmit queues.

14. The system according to claim 13, the ingress nodes are operative for are requesting transmission of the credits from the egress nodes to the ingress nodes.

15. The system according to claim 14, further comprising a processor configured as a bandwidth manager and linked to the ingress nodes and the egress nodes, wherein requesting transmission of the credits and receiving credits are performed by the bandwidth manager.

16. The system according to claim 13, wherein the egress nodes are operative for autonomously transmitting the credits to the ingress nodes.

17. The system according to claim 13, wherein the hash table consists of a single hash table that services all the transmit queues.

18. The system according to claim 13, wherein the hash table comprises a plurality of hash tables that service one or more of the transmit queues.

19. The system according to claim 13, wherein a size of the hash table is based on a round trip time between the ingress nodes and the egress nodes and a latency variation for passage through the fabric.

20. The system according to claim 13, wherein a size of the hash table is determined according to a size of a packet memory in the egress nodes that is allocated for packet buffering.

21. The system according to claim 13, further comprising consuming the credits by transmitting the new packets according to positions thereof in the virtual output queues.

22. The system according to claim 21, wherein the ingress nodes have fabric ports and transmitting the new packets comprises selecting the fabric ports of the ingress nodes according to a load-balancing algorithm and enqueuing the new packets in transmit queues of the selected fabric ports of the ingress nodes.

23. The system according to claim 13, wherein sizes of the transmit queues are established according to bandwidths of fabric ports of the ingress nodes and a latency measured by a time required to conclude a handshake between the transmit queues and the virtual output queues.

24. The system according to claim 13, wherein a key of the hash table is a combination of the respective packet sequence numbers and an ordering domain of the transmitted new packets.

25. The method according to claim 1, further comprising iterating the steps of finding in the hash table and thereafter forwarding the new packet, wherein in successive iterations the desired packet sequence number is selected in order of the packet sequence numbers of the new packets.

\* \* \* \* \*